May 12, 1942.  F. M. KINCAID, JR  2,282,543
SEALING RING FOR ROTARY HYDRAULIC CLUTCHES
Filed Jan. 13, 1941
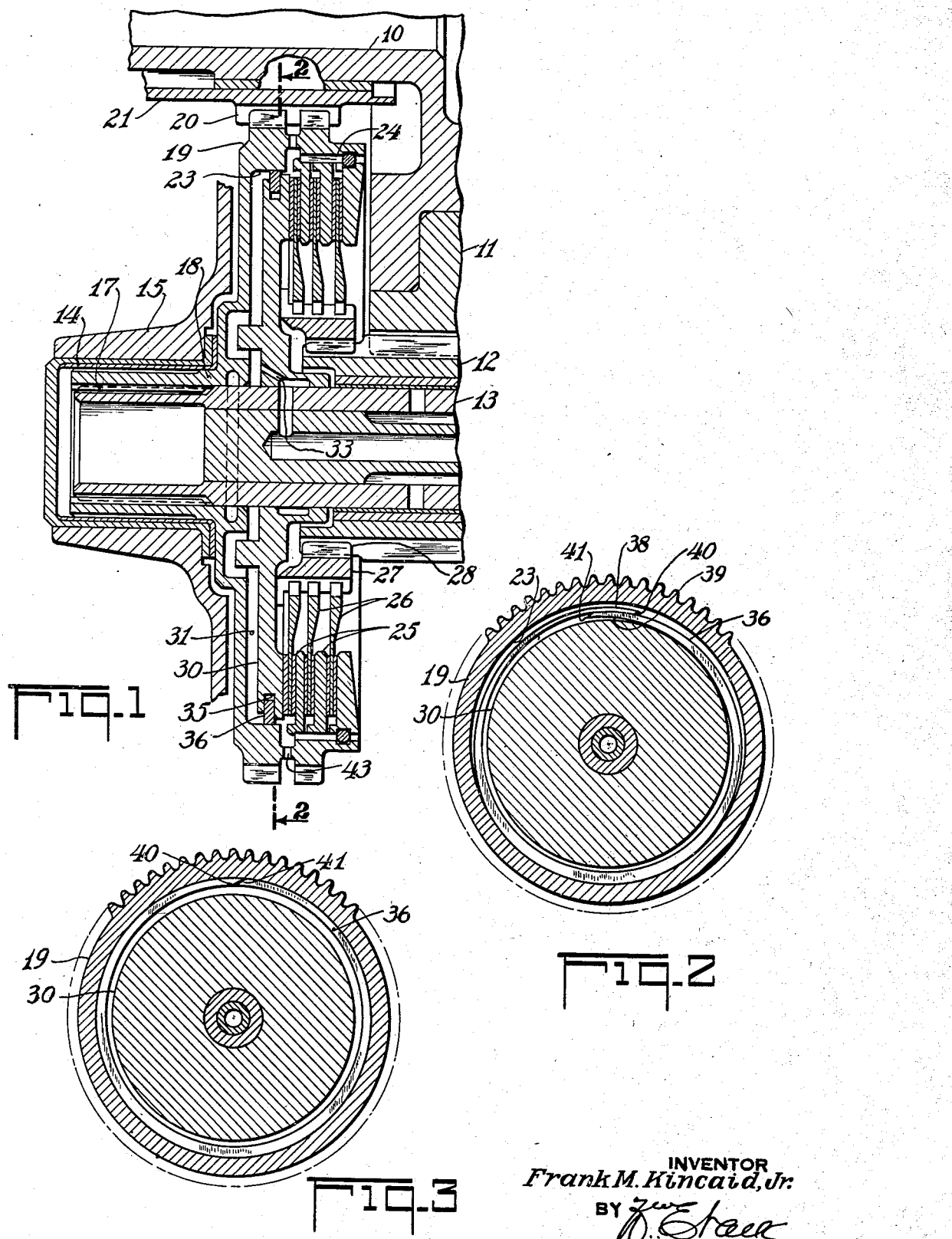
INVENTOR
Frank M. Kincaid, Jr.
BY
ATTORNEY Patented May 12, 1942

2,282,543

UNITED STATES PATENT OFFICE 2,282,543

SEALING RING FOR ROTARY HYDRAULIC CLUTCHES

Frank M. Kincaid, Jr., Mountain Lakes, N. J., assignor to Wright Aeronautical Corporation, a corporation of New York Application January 13, 1941, Serial No. 374,265

8 Claims. (Cl. 192—85)

This invention relates to sealing rings for piston-cylinder assemblies and is particularly concerned with a sealing arrangement which will become active when the piston is rotated at substantial speed on its own axis and which shall become inactive when the piston is rotated either at low speed or not at all.

An object of the invention is to provide a sealing arrangement for the operating hydraulic cell of a rotating clutch, an associated object being to provide means by which hydraulic fluid in the clutch cell may be released therefrom when the clutch assembly is not rotating.

Further objects comprise the provision of a special form of piston ring, in a rotatable piston, which may expand into sealing engagement with a cylinder under the influence of centrifugal force, and contract out of sealing engagement with the cylinder when the centrifugal force is small or nil.

Further objects of the invention will become apparent in reading the annexed detailed description in connection with the drawing, in which:

Fig. 1 is a longitudinal section through a clutch and hydraulic operating cell utilizing the invention;

Fig. 2 is a section on the line 2—2 of Fig. 1, showing the sealing means under non-rotating conditions; and Fig. 3 is a section similar to Fig. 2, showing the sealing means in operative position.

Although this invention may be used in any appropriate environment, it is particularly adapted for use in rotating hydraulically operated clutches as used in aircraft engines. The specific arrangement shown in Fig. 1 is a portion of a two-speed supercharger drive of an aircraft engine wherein 10 is a portion of the engine crankshaft to which is secured a gear 11 meshed with a pinion 12 journalled on a layshaft 13 which in turn is journalled in a bearing 14 mounted in a housing 15. To the layshaft 13 is splined, as at 17, the hub 18 of a gear 19 which is meshed with a pinion 20 forming a part of a supercharger impeller shaft 21. The rim of the gear 19 comprises a hydraulic cylinder 23, and also comprises an internally splined portion 24 with which clutch plates 25 are engaged for rotation therewith and for axial movement relative thereto. Alternate clutch plates 26, between the plates 25, are splined to a hub 27 in turn splined to the pinion 12 as at 28. Within the cylinder 23 is a piston 30, defining a hydraulic cell 31 into which pressure fluid may be selectively fed through passages 33 in the piston and in the layshaft, the piston being mounted for free rotation on the layshaft 13. When pressure fluid is admitted to the cell 31, the clutch plates 25 and 26 are engaged with one another to effect a 1:1 drive from the pinion 12 to the gear 19 while, when hydraulic pressure is relieved from the cell 31, the gear 19 is uncoupled from the pinion 12 and may rotate freely with respect thereto. So far as drive ratios other than 1:1 are concerned, the mechanism relative thereto does not form a part of this invention and accordingly, such mechanism is not shown.

The invention is particularly concerned with the sealing of the piston 30 with respect to the cylinder 23 and in this connection, the piston is grooved at 35 to receive a split piston ring 36 which, when the piston and cylinder are rotating at high speed, is in contact at its periphery with the cylinder wall and thus seals the cell 31 against leakage of pressure fluid.

The ring 36, as shown in Figs. 2 and 3, is of special form and is so constructed that at rest, the ring ends 38 and 39 are in overlapping relation, leaving a substantial clearance between the ring periphery and the cylinder wall. The ring is of elastic material and tends to maintain its overlapped form unless expanding force is imposed thereon. When pressure fluid is admitted to the cell 31, the clutch plates 25 and 26 will be lightly engaged with one another, tending to induce joint rotation of the pinion 12 and the gear 19; however, there will be substantial leakage, at first, between the ring 36 and the cylinder 23 so that the driving effort will not be complete. As the rotational speed of the piston increases, centrifugal force will act upon the ring 36 and will shortly expand the ring into full peripheral sealing engagement with the wall of the cylinder 23, as shown in Fig. 3, whereupon leakage of pressure fluid from the cell 31 is substantially prevented, except for that fluid which may leak between the small gap at the ends of the piston ring and other minor orifices which exist in the system. When it is desired to de-clutch the gear 19 from the pinion 12, pressure fluid is turned off and that fluid which remains in the cell 31 will slack off in pressure as leakage of the fluid takes place, allowing for disengagement of the clutch and gradual reduction in speed of the piston 30. As the speed falls off, the piston ring 36 will contract to the position of Fig. 2 to unload any remaining fluid which exists in the cell 31. In contracting, the ends 38 and 39 of the piston ring 36 override one another, which action is permitted by the complementary chamfer of the ring ends as shown at 40 and 41.

The use of a sealing ring such as above disclosed and described tends to prevent the accumulation of sludge and foreign matter in the cell 31 which accumulation may interfere with proper operation of the clutch. To allow of free oil bleed from the cell 31, the gear rim is peripherally drilled at 43 so that pressure fluid may escape without having to pass through the clutch plate assembly and without having to pass through the restricted splined connections between the clutch plates 25 and the gear rim.

Several methods may be used in forming the initially contracted ring 36. For example, annealed square wire may be bent in the form of an overlapping coil and then heat treated to develop the elastic properties of the material, after which the ring may be surface ground on both sides and interiorly and exteriorly formed after expansion on a mandrel, to produce a true circular periphery for the ring when the ends thereof are in alignment. Other methods of fabrication will readily suggest themselves to those skilled in the metal working arts.

Preferably the ring, when expanded, is defined by an inner circular edge eccentric to the outer circular edge, the widest part of the ring being opposite the gap. Thus, the ring will tend to maintain a uniform exterior curvature as it expands and contracts, without stress concentration opposite the gap.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a clutch assembly, a rotating cylinder, an axially movable piston therein rotatable with and with respect to the cylinder, said piston having a peripheral groove, and a sealing ring in said groove preformed to elastically assume an effective diameter, at rest, less than the inside diameter of the cylinder, said ring being expansible under the influence of centrifugal force, due to piston rotation, to sealingly engage the cylinder wall.

2. In a rotating piston-cylinder assembly wherein the piston and cylinder are rotatable on their own axis, said piston having a peripheral groove, a resilient seal ring seated in the groove, said ring being formed, at rest, with overlapping ends to have an effective diameter substantially less than the diameter of the cylinder, said ring being expansible under the influence of centrifugal force as caused by piston rotation to expand to cylinder wall sealing engagement.

3. A split seal ring which at rest comprises in axial aspect overlapped ends each of which is chamfered in complement to the other, so that, as the ring is expanded to an attitude where the ends are separated, the ring ends slide over one another, said ring having externally, a true circular form when the ring ends are in substantial alignment and when the chamfered ends are not bearing on one another and having substantially spiral form when the ends are overlapped.

4. A seal adapted to be operated in a centrifugal field of varying intensity comprising a split resilient ring having a normally spiral form and having its ends overlapped when the centrifugal force is low, said ring being expanded by increase in centrifugal force to truly circular form and to a position in which the ring ends are separated and in substantial end-to-end alinement, the ring ends being chamfered to override one another as the centrifugal force is decreased.

5. In a seal assembly, a split resilient ring having normally spiral form and overlapping ends, means to expand the ring to bring the ring ends into substantial alinement and to bring the ring periphery to truly circular form, and means on the ring ends to guide same to an unalined overlapping relationship when the expanding means is inoperative.

6. In a rotatable piston-cylinder assembly, the piston having a groove, a split resilient seal ring in the groove preformed to overlap at its ends at rest or low speed rotation of the assembly, and adapted to expand into substantially circular form, with the ring ends opposite one another in spaced relation and with the ring periphery engaged with the cylinder wall, under the influence of centrifugal force as produced by high speed rotation of the assembly.

7. In a rotatable piston-cylinder assembly, the piston having a groove, a split resilient seal ring in the groove preformed to overlap at its ends at rest or low speed rotation of the assembly, and adapted to expand into substantially circular form, with the ring ends opposite one another in spaced relation and with the ring periphery engaged with the cylinder wall, under the influence of centrifugal force as produced by high speed rotation of the assembly, and means at the ring ends to guide one over the other to overlapping relation when the assembly rotation is slowed or stopped.

8. In a rotating piston-cylinder assembly subject to high and low speed rotation, means operable under the influence of centrifugal force to seal the piston to the cylinder at high rotational speeds, and to unseal the piston relative to the cylinder at low rotational speeds, said means comprising a normally contracted split resilient seal ring whose ends overlap and which has no cylinder sealing engagement between the piston and cylinder which is expanded into operative sealing relation throughout its periphery under the influence of centrifugal force.

FRANK M. KINCAID, JR.